(12) United States Patent
Alkendi et al.

(10) Patent No.: US 10,259,725 B2
(45) Date of Patent: Apr. 16, 2019

(54) METHOD OF SYNTHESIZING CELLULOSE NANO-CRYSTALS FROM DATE PALM SEEDS

(71) Applicant: UNITED ARAB EMIRATES UNIVERSITY, Al-Ain (AE)

(72) Inventors: Ruwaya Alkendi, Al-Ain (AE); Victor Sagaya, Al-Ain (AE)

(73) Assignee: United Arab Emirates University, Al-Ain (AE)

( * ) Notice: Subject to any disclaimer, the term of this patent is extended or adjusted under 35 U.S.C. 154(b) by 83 days.

(21) Appl. No.: 15/396,307

(22) Filed: Dec. 30, 2016

(65) Prior Publication Data

US 2018/0186664 A1    Jul. 5, 2018

(51) Int. Cl.
| | | |
|---|---|---|
| C02F 1/36 | (2006.01) | |
| C02F 1/44 | (2006.01) | |
| B01D 67/00 | (2006.01) | |
| B01D 71/10 | (2006.01) | |
| C08B 16/00 | (2006.01) | |

(52) U.S. Cl.
CPC .......... *C02F 1/442* (2013.01); *B01D 67/0004* (2013.01); *B01D 71/10* (2013.01); *C02F 1/36* (2013.01); *C08B 16/00* (2013.01); *B01D 2323/08* (2013.01); *B01D 2323/10* (2013.01); *C02F 2303/04* (2013.01)

(58) Field of Classification Search
None
See application file for complete search history.

(56) References Cited

U.S. PATENT DOCUMENTS

2007/0051240 A1    3/2007    Lin

FOREIGN PATENT DOCUMENTS

CN    102806021    12/2012

OTHER PUBLICATIONS

Nabil et al, Extraction and Characterization of Cellulose From Date Palm Seeds (*Phoenix dactylifera* L.), Cellulose chemistry and technology, 2014.*
"Cellulose fibers obtained by organosolv process from date palm rachis (*Phoenix dactylifera* L.)", H Ammar et al 2012 IOP Conf. Ser.: Mater. Sci. Eng. 28 012002.*

\* cited by examiner

*Primary Examiner* — Krishnan S Menon
(74) *Attorney, Agent, or Firm* — Richard C. Litman

(57) ABSTRACT

A method of synthesizing cellulose nano-crystals from date palm seeds includes providing washed and dried date palm seeds, milling the date palm seeds to a fine powder, adding a bleaching agent to the fine powder to separate cellulose from the powder, placing the cellulose in a container with an acid solution to form a mixture, heating the mixture, isolating cellulose crystals from the mixture, and reducing the particle size of the cellulose crystals in the solution to provide cellulose nano-crystals. The particle size can be reduced by adding the cellulose crystals to a quantity of water to form a solution, and ultrasonicating the solution at about 90% amplitude for about 45 minutes to form cellulose nano-crystals. The cellulose nano-crystals can have a size ranging from about 5 nm to about 100 nm.

7 Claims, 5 Drawing Sheets

METHOD OF SYNTHESIZING CELLULOSE NANO-CRYSTALS FROM DATE PALM SEEDS

BACKGROUND OF THE INVENTION

1. Field of the Invention

The present invention relates to filtration and particularly to nano-filters derived from date palm pits for the removal of virus and/or bacteriophage from drinking water.

2. Description of the Related Art

Persistent reduction of natural drinking water reservoirs has raised the demand for efficient water treatment, reprocessing, or purification strategies. Traditionally, water treatment has involved lengthy chemical disinfection procedures to meet rigorous microbial safety standards for water reuse. As such, bio-filters have become a more preferable alternative for the successful removal of contaminants, such as heavy metals and pathogens from fresh water. Bio-filter membranes made of cellulose nanomaterials, in particular, are advantageous for water filtration due to their high surface area-to-volume ratio, low environmental impact, high strength, sustainability, and ability to remove pathogens, such as viruses, from water.

The date palm tree is one of the most important cultivated trees in arid and semi-arid regions, especially in North Africa and the Arabian Gulf countries. The United Arab Emirates (UAE) is one of the largest date producing countries in the world. At present, UAE grows about 160 varieties of dates. The country cultivates 44 million palm trees that produce 76,000 tons of dates per year, which is 6% of the total world date production (FAO, 2004). As such, a significant amount of date waste, including date pits (DP) and date fiber (DF), are produced annually. Date fiber is an insoluble, powder-like constituent connected with the non-nutritive portion of the date flesh, which is a by-product of date syrup production. The total dietary fiber found in date seed was 58% with 53% of it being insoluble dietary fiber, such as hemicellulose, cellulose, and lignin.

Nano-filtration technology is used for separating molecules in aqueous solution, and is used in water treatment and in food industries. Generally, a nano filtration membrane is a type of pressure driven membrane possessing a pore size ranging from 1-10 nm. Nano-filtration membranes provide a high water flux at low operating pressure and maintain a high salt and organic matter rejection rate. The nano filtration process offers the benefits of ease of operation, reliability, comparatively low energy consumption, as well as highly efficient pollutant removal. Nano-filtration membranes have been employed in pre-treatment unit operations in both thermal and membrane seawater desalination processes. This has resulted in a reduction in chemicals used in pre-treatment processes as well as a decrease in the energy consumption and water production costs and, therefore, has led to more environmentally friendly processes. Nano-filtration also minimizes scale formation on equipment involved in both reverse osmosis and thermal desalination processes.

Thus, a nano-filter including nano-crystals derived from palm seeds thereby solving the aforementioned problems is desired.

SUMMARY OF THE INVENTION

A method of synthesizing cellulose nano-crystals from date palm seeds includes providing washed and dried date palm seeds, milling the date palm seeds to a fine powder, adding a bleaching agent to the fine powder to separate cellulose from the powder, placing the cellulose in a container with an acid solution to form a mixture, heating the mixture, isolating cellulose crystals from the mixture, and reducing the particle size of the cellulose crystals in the solution to provide cellulose nano-crystals. The particle size can be reduced by adding the cellulose crystals to a quantity of water to form a solution, and ultrasonicating the solution at about 90% amplitude for about 45 minutes to form cellulose nano-crystals. The cellulose nano-crystals can have a size ranging from about 5 nm to about 100 nm.

A method of preparing a cellulose nano-filter includes heat pressing the cellulose nano-crystals in a conventional heat press device at a temperature of about 105° C. and at an applied pressure of about 15000 tons for about 10 minutes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
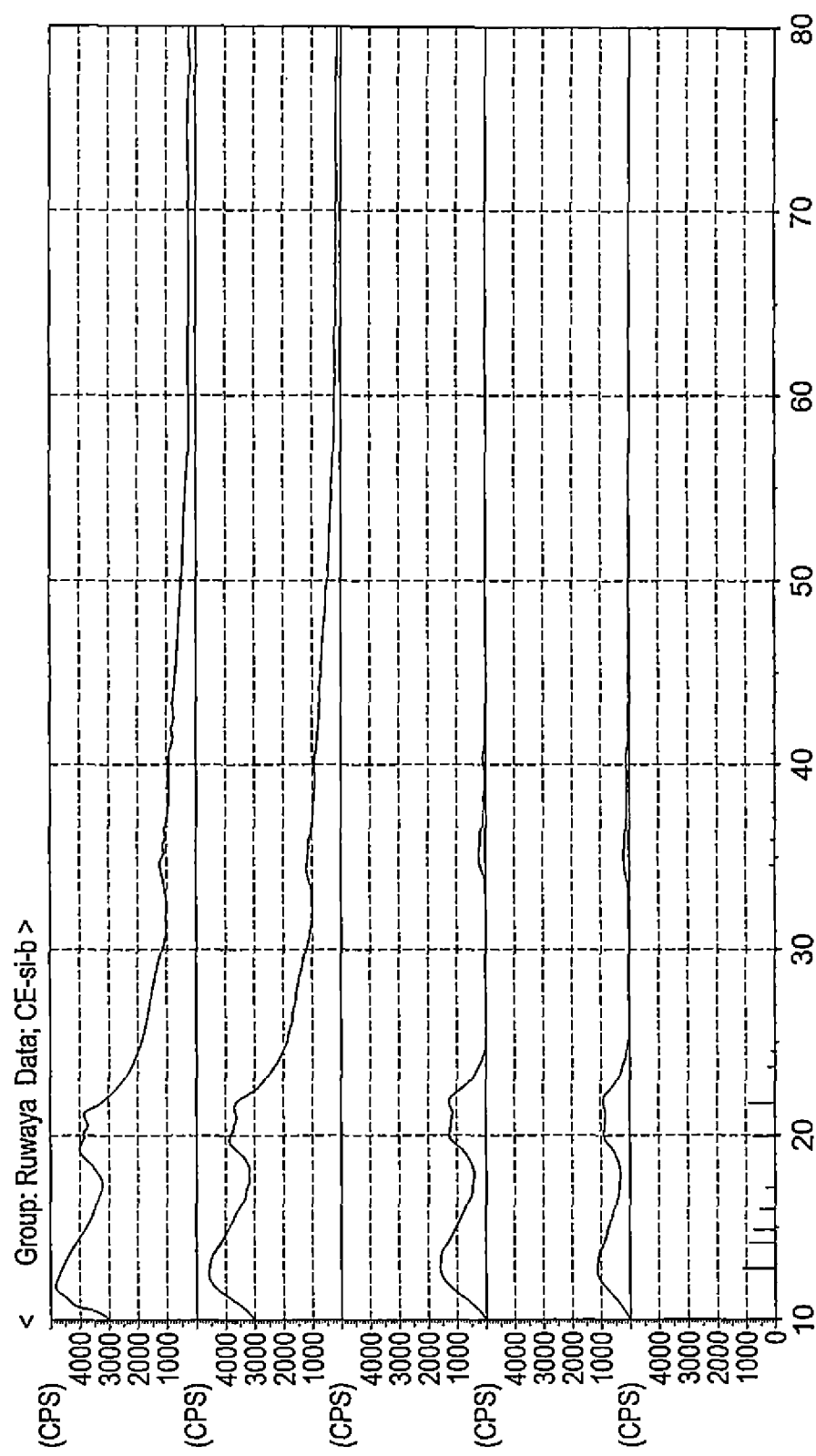
FIG. 1 shows the X-ray diffraction pattern (XRD) of cellulose particles representing both crystalline and amorphous phases.

A method of synthesizing cellulose nano-crystals from date palm seeds includes providing date palm seeds, milling the date palm seeds to a fine powder, adding a bleaching agent to the fine powder to separate cellulose from the powder, combining the cellulose with an acid solution to form a mixture, heating the mixture, isolating cellulose crystals from the mixture, and reducing the particle size of the cellulose crystals in the solution to provide cellulose nano crystals. The particle size can be reduced by adding the cellulose crystals to a quantity of water to form a solution, and ultrasonicating the solution at about 90% amplitude for about 45 minutes to form cellulose nano-crystals. The cellulose nano-crystals can have size ranging from about 5 nm to about 100 nm.

The bleaching agent can be sodium hypochlorite or hydrogen peroxide, for example. The acid used with the date palm seed can be a concentrated sulfuric acid ($H_2SO_4$), or other suitable acid. The mixture can be heated, for example, for about 45 minutes in a water bath held at a temperature ranging from about 35° C. to about 55° C., preferably about 45° C. The cellulose crystals can be isolated using centrifugation. The centrifugation step can be conducted at a speed of about 10,000 rpm and at a temperature of about 10° C.; and the centrifugation step can be repeated at least five times.

A cellulose nano-filter can be prepared from the cellulose nano-crystals by heat pressing the cellulose nano-crystals. For example, the cellulose nano-crystals can be heated in a conventional heat press at a temperature of about 105° C. and at an applied pressure of about 15,000 tons for about 10 minutes. The nano-filter can have an average pore size ranging from about 5 nm to about 200 nm. For example, the nano-filter can have 5 nm, 10 nm, and/or 50 nm pore sizes. During filtration of the viral suspension, a vacuum can be used. It is noted that the vacuum can be adjusted and optimized to a suitable pressure to filter viral suspensions.

A process of purifying water includes passing water through the cellulose nano filter. The nano-filter can remove viruses and/or bacteria from the water. The bacteria can include, for example, E. coli. The virus can include bacteriophages.

As used herein, the term "nanoparticle" refers to a particle having at least one dimension sized between 1 and 100 nanometers. As used herein, the term "cellulose" refers to an organic compound with the formula $(C_6H_{10}O_5)_n$, a polysaccharide consisting of a linear chain of several hundred to many thousands of β(1→4) linked D-glucose units. A "virus" is a microorganism that is smaller than a bacterium and are intracellular parasites that can only reproduce and function inside the living organism or cells. The virus can include animal viruses, plant viruses, and/or bacterial viruses (bacteriophages). "Bacteriophages" are viruses that infect bacterial species. Bacteriophages can be present wherever bacteria are present. Sewage water is a rich source of bacteriophages that infect bacteria such as E. coli (Escherichia coli).

The following examples will further illustrate the processes of making the nano filter from date palm seeds and a method of purifying drinking water.

Example 1

Preparation of Cellulose Nano Crystals

Date palm seeds were collected from United Arab Emirates University campus, UAE. The seeds were washed, dried, and milled to fine powder. In order to separate other particles from cellulose, bleach was used. Preparation of the nano-crystals was carried out in a cylinder containing 5% of cellulose powder and 65% of $H_2SO_4$. The cylinder was heated in a water bath at 45° C. for 45 min. After the heating, the sample was centrifuged at 10,000 rpm at 10° C. for 10 min and the steps were repeated 5 times. Finally, the sample was washed with distilled water and stored at 4° C. The cellulose nano-crystals were prepared by breaking down the cellulose crystals in the sample into smaller sizes to adjust the desired filter pore size. The samples for ultrasonication were prepared by combining 1200 mg of cellulose crystals with 4 ml of de-ionized water. Samples were placed for ultrasonic treatment (Q55-110 Ultrasonicator, Qsonica, Boston USA) at 90% amplitude for 45 min. This resulted in achieving smaller particle size and, ultimately, smaller filter pore size.

X-ray diffraction (ARL XRD diffractometer, Thermoscientific) was performed to determine the structure of cellulose fibers for regular crystal structure versus amorphous structure. Cellulose crystals were placed in a holder and placed inside the chamber of an X-Ray diffraction machine. The rays pass through the cellulose crystals and identify the structure of the crystals. To measure the particle sizes, scanning electron microscopy (SEM) (Hitachi S-3000 N, SEM) was performed. Samples were placed in a holder and were inserted in between two carbon tapes. Samples were transferred into the golden chamber for the coating. After that, the samples were visualized under the scanning electron microscope (SEM) by using different magnification powers.

Figure 2:
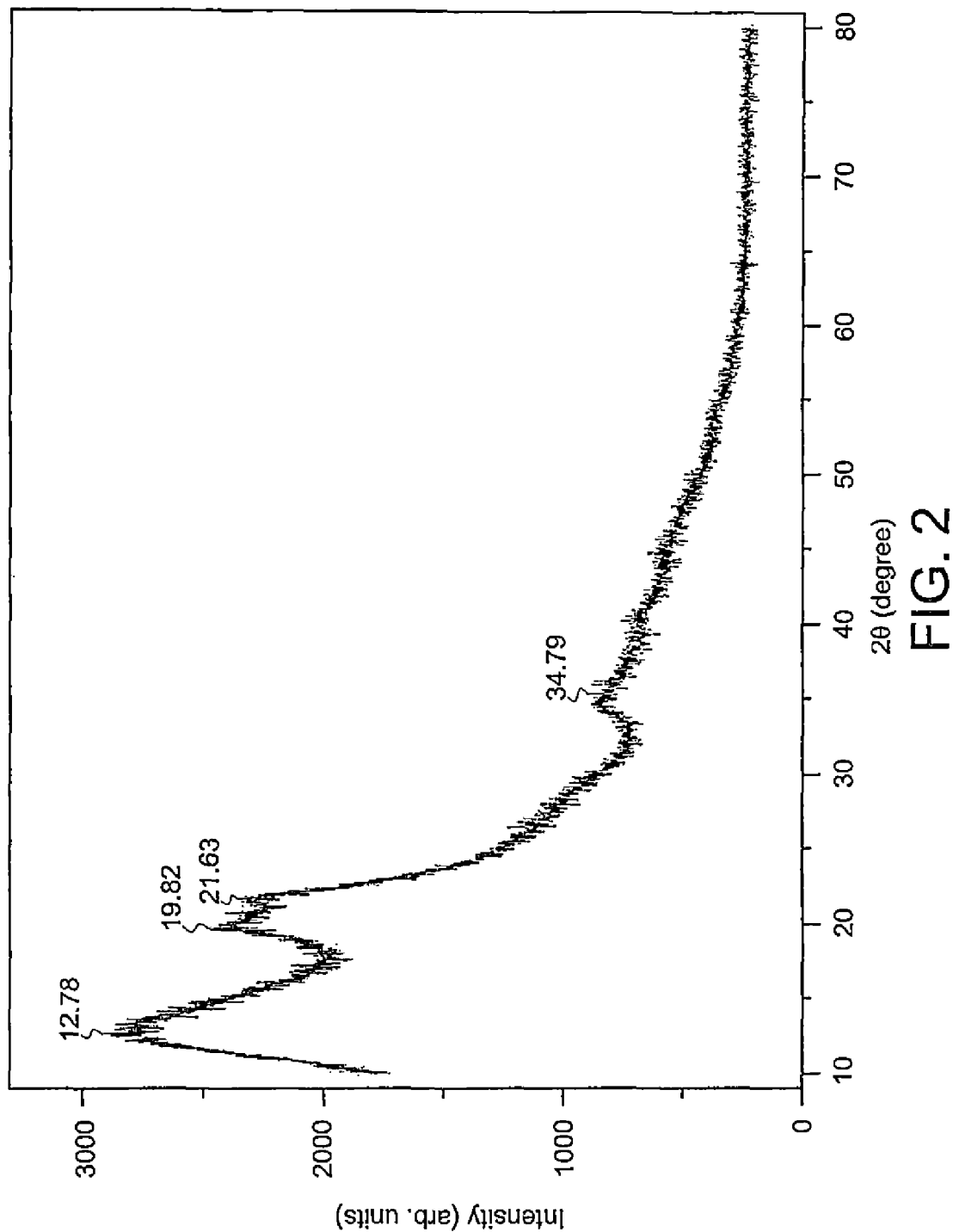
FIG. 2 shows the XRD pattern showing the peaks corresponding to the crystalline structure of cellulose obtained from date pit.
Figure 3A:
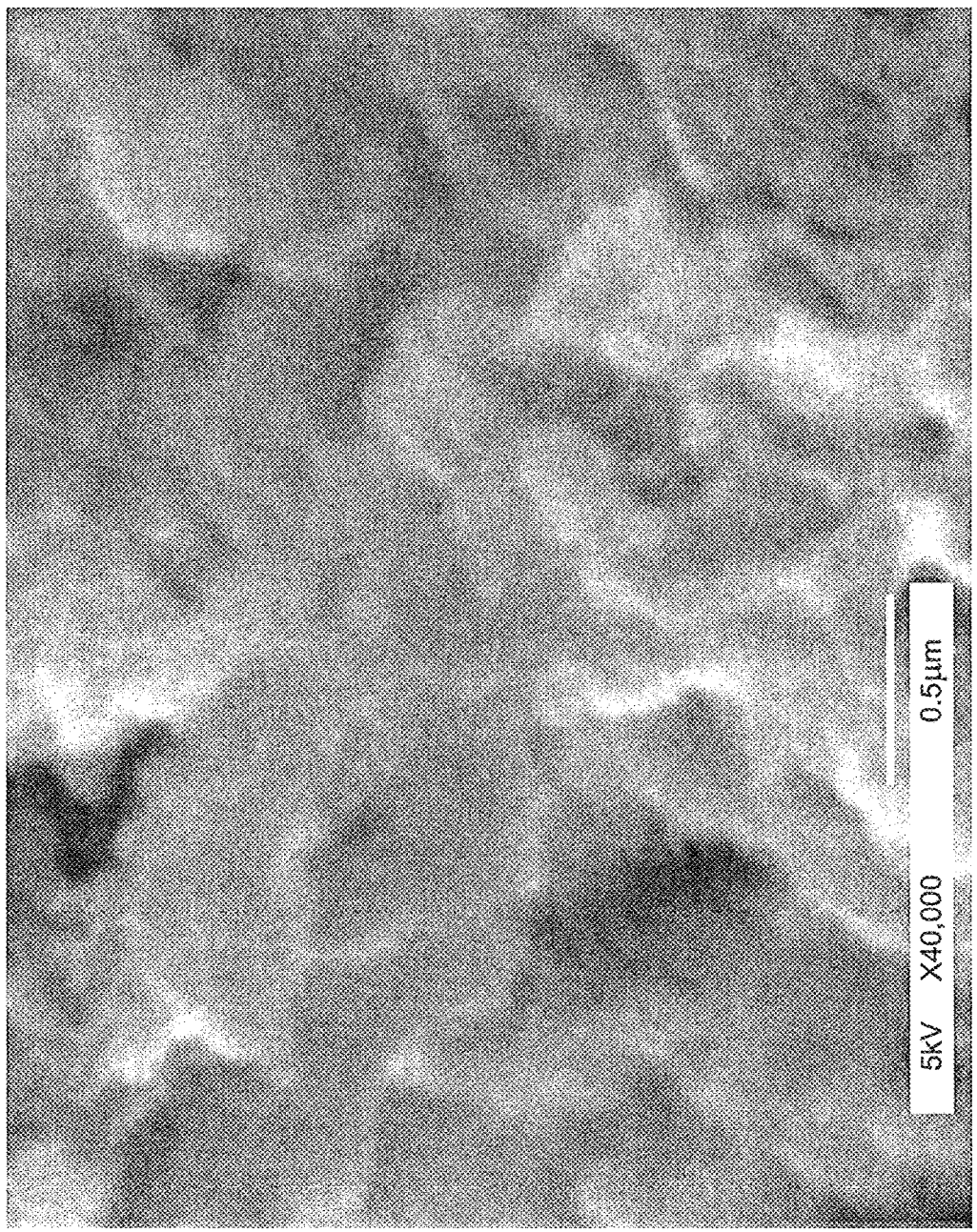
FIGS. 3A, 3B, and 3C show the scanning electron microscope (SEM) images of cellulose particle observed under SEM with different size and magnification power.
Figure 3B:
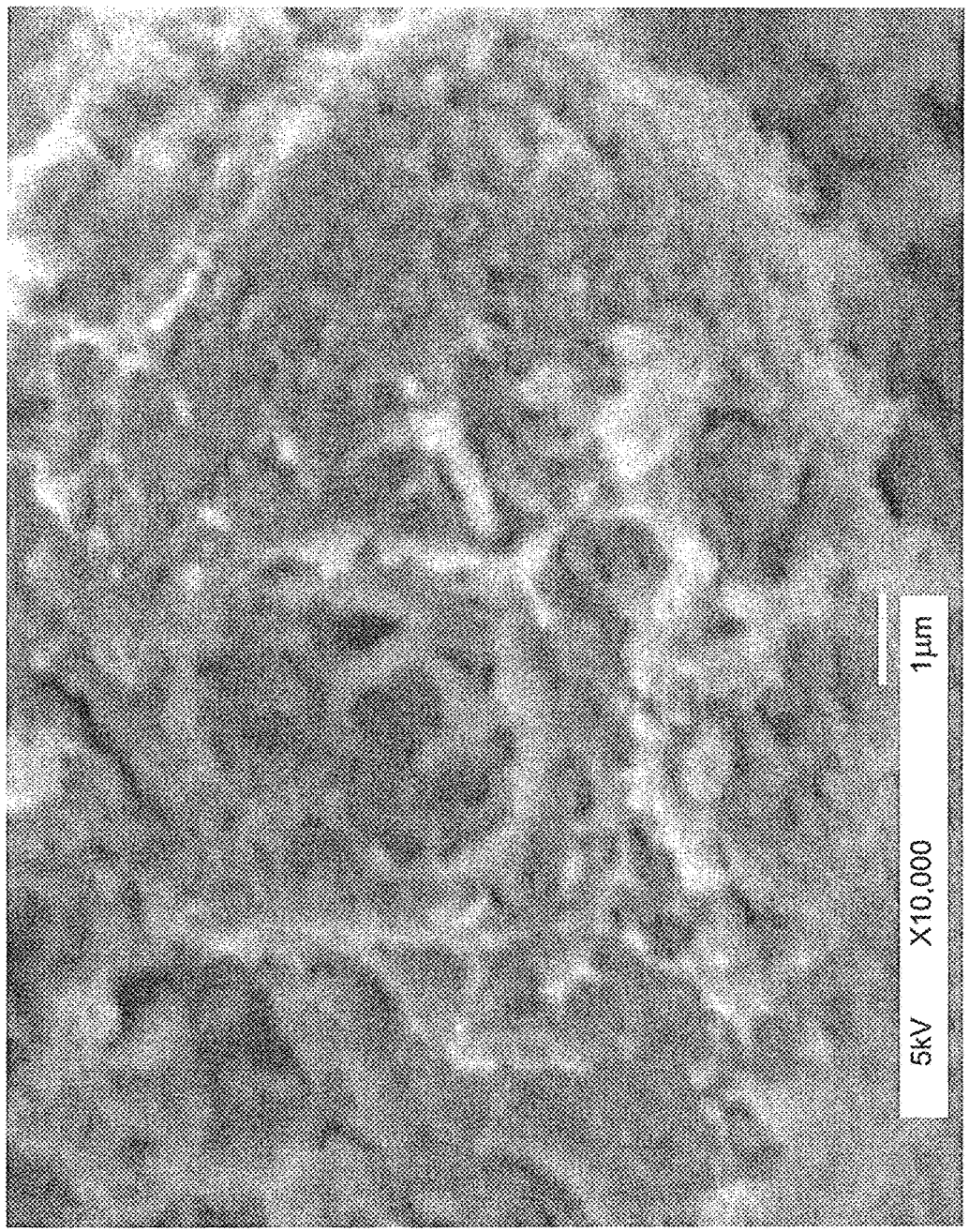
Figure 3C:
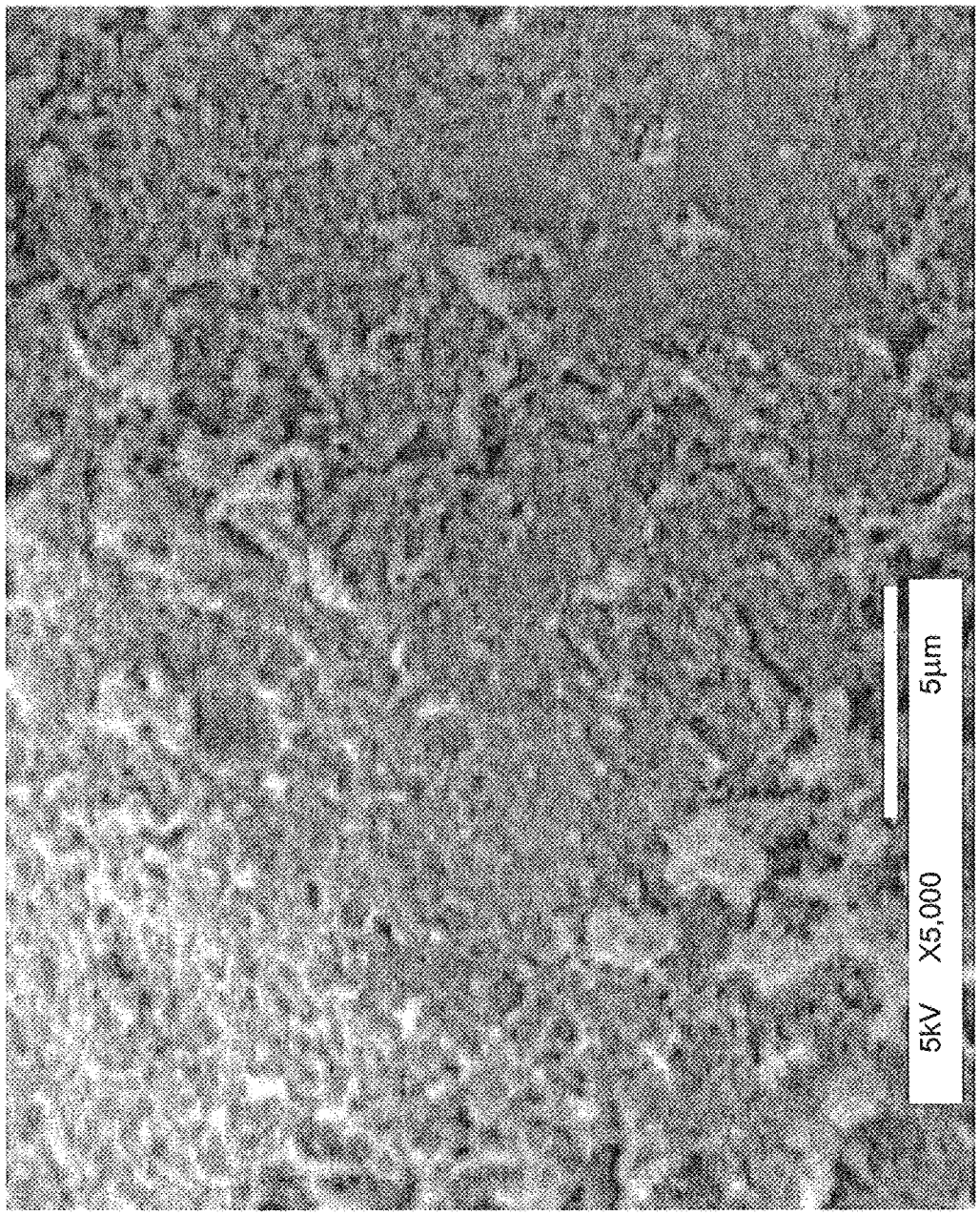

FIG. 1 shows various X ray diffraction results of cellulose particles showing both crystal and amorphous phases of the cellulose particles. The regular peaks represent the crystalline phase while amorphous phase are depicted by the irregular shape. FIG. 2 shows an exemplary X-ray diffraction spectrum of the cellulose crystal showing the peaks for the crystalline phases of the cellulose particles. The size of the particles was measured using Scanning Electron Microscopy (SEM). Three different sizes of cellulose particles (25 nanometers, 1 micrometer, and 5 micrometer) were determined, as shown in FIGS. 3A, 3B, and 3C. The different sizes of cellulose crystal particles determine the pore size of the filter when submitted to heat press.

Example 2

Preparation of Cellulose Nano Crystals

The filters were prepared by a conventional heat press method using a heat press device (CARVER 9731 Heat press, Germany). Cellulose particles (300 mg) were placed inside a holder and placed between the two plates of the heat press. Heat and pressure were adjusted at 105° C. and 15000 tons respectively. After applying the press for about 10 minutes, the resulting cellulose nanocrystal filters were formed and isolated from the press for further testing and use.

The nano-filter formed after using the heat press can be generally circular, having a diameter equal to about 47 mm. For the nano-filter, it is desirable that the particles are distributed generally evenly. The pores are small enough (nano-sized) to block viruses from passing through the filter.

The quality examination of the nano-filter revealed that the nano-filter has a pore size that is smaller than the size of the phage viruses and bacterial cells. It was observed that if the particle size of the cellulose was further reduced, and if the holding capability was increased, then the efficiency could be further improved and additional small particles could be removed.

Example 3

Filtration of Viruses in Sewage Water Using the Cellulose Nano Crystal Filter

Sewage water from Al Ain, UAE (Al Masood & Al Saad) was collected and filtered using a conventional Whatman filter (70 mm) to remove the bigger particles and to avoid coagulation. Then a normal 0.22 micron filter was used to isolate the phage viruses and the filtrate was concentrated by centrifugation at 16,000 rpm for 30 minutes.

The nutrient agar plates were prepared and 1 ml of E. coli (gram negative) an Staphylococcus aureus (gram positive) from available stock, were added, air dried under the safety cabin and then incubated at 37° C. in an incubator overnight. Freshly prepared bacterial culture plates were removed from the incubator and put in the safety cabin. Then 0.2 ml of Phage solution (a filtered sewage sample) was added to a rapidly growing culture of E. coli, and the phage solution was spread on the plate in triplicates and dried for 10 minutes under the laminar flow hood. These plates were again placed inside the incubator at 30° C. for 1 day. It was observed that the phages infected the E. coli. The number of phage particles were counted by counting the single circular, non-turbid area called plaque in the plate (11, 9, 10 particle).

The above step was repeated twice and it was found that there was an average of 120-140 particles in total volume of 3 ml of phage solution.

After confirming that phage viruses are present in the solution, the nano-filters were tested to determine whether they could be used to trap or capture phages. The solution containing the phage viruses (about 9 particles) was filtered using the nano-filter. Then the filter and the filtrate (0.2 ml) were added to the freshly prepared *E. coli* culture plates in triplicates. These plates were placed in the incubator at 30° C. for 24 hours and it was observed that one plate contained two plaques, while two other had no growth at all.

The above examples illustrate that the nano-filter made up of purely 100% cellulose extracted from date seed has the capacity to remove bacteria and phage viruses. Thus, the nano-filter provides a unique product for filtering bacteria and phage viruses from drinking water. Date waste being cost effective, could easily be applied commercially by nanomaterial or biotech companies in the global market to provide safe and clean water.

It is to be understood that the present invention is not limited to the embodiments described above, but encompasses any and all embodiments within the scope of the following claims.

We claim:

1. A method of synthesizing cellulose nano-crystals from date palm seeds, comprising:
   providing date palm seeds;
   milling the date palm seeds to a fine powder;
   adding a bleaching agent to the powder to separate cellulose from the powder;
   combining the cellulose with an acid solution to form a mixture;
   heating the mixture to form cellulose crystals;
   isolating cellulose crystals from the mixture, wherein isolating the cellulose crystals from the mixture includes centrifuging the mixture at a speed of about 10,000 rpm and at a temperature of about 10° C.; and
   reducing the particle size of the cellulose crystals to provide cellulose nano-crystals.

2. The method of synthesizing cellulose nano-crystals from date palm seeds according to claim 1, further comprising washing the cellulose crystals with distilled water and storing at about 4° C.

3. The method of synthesizing cellulose nano-crystals from date palm seeds according to claim 1, wherein the bleaching agent comprises at least one of sodium hypochlorite and hydrogen peroxide.

4. The method of synthesizing cellulose nano-crystals from date palm seeds according to claim 1, wherein the acid is sulfuric acid.

5. The method of synthesizing cellulose crystals from date palm seeds according to claim 1, wherein the particle size of the cellulose crystals is reduced by adding the cellulose crystals in a quantity of water to form a solution; and ultrasonicating the solution at about 90% amplitude for about 45 minutes to form the cellulose nano-crystals.

6. The method of synthesizing cellulose crystals from date palm seeds according to claim 1, further comprising the step of heat pressing the cellulose nano-crystals in a heat press at a temperature of about 105° C. and at an effective amount of applied pressure for about 10 minutes to provide the nano-filter.

7. A method of synthesizing cellulose nano-crystals from date palm seeds, comprising:
   providing date palm seeds;
   milling the date palm seeds to a fine powder;
   adding a bleaching agent to the powder to separate cellulose from the powder;
   combining the cellulose with an acid solution to form a mixture;
   heating the mixture to form cellulose crystals;
   isolating cellulose crystals from the mixture; and
   reducing the particle size of the cellulose crystals to provide cellulose nano-crystals, wherein the particle size of the cellulose crystals is reduced by adding the cellulose crystals in a quantity of water to form a solution and ultrasonicating the solution at about 90% amplitude for about 45 minutes to form the cellulose nano-crystals.

* * * * *